US008115753B2

(12) United States Patent
Newton

(10) Patent No.: US 8,115,753 B2
(45) Date of Patent: Feb. 14, 2012

(54) TOUCH SCREEN SYSTEM WITH HOVER AND CLICK INPUT METHODS

(75) Inventor: John Newton, Auckland (NZ)

(73) Assignee: Next Holdings Limited (NZ)

( * ) Notice: Subject to any disclaimer, the term of this patent is extended or adjusted under 35 U.S.C. 154(b) by 947 days.

(21) Appl. No.: 12/101,527

(22) Filed: Apr. 11, 2008

(65) Prior Publication Data

US 2008/0259053 A1    Oct. 23, 2008

(30) Foreign Application Priority Data

Apr. 11, 2007    (NZ) .......................................... 554416

(51) Int. Cl.
*G06F 3/042*    (2006.01)
(52) U.S. Cl. ..................................... 345/175; 178/18.09
(58) Field of Classification Search .......... 345/173–179; 178/18.01–18.11
See application file for complete search history.

(56) References Cited

U.S. PATENT DOCUMENTS

| | | |
|---|---|---|
| 844,152 A | 2/1907 | Little |
| 2,407,680 A | 9/1946 | Palmquist et al. |
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,563,771 A | 2/1971 | Tung |
| 3,613,066 A | 10/1971 | Cooreman |

(Continued)

FOREIGN PATENT DOCUMENTS

AU    7225001    1/2002

(Continued)

OTHER PUBLICATIONS

"International Application Serial No. PCT/US2008/060102, Search Report & Written opinion mailed Feb. 12, 2009", 20 pgs.

(Continued)

*Primary Examiner* — Amare Mengistu
*Assistant Examiner* — Hong Zhou
(74) *Attorney, Agent, or Firm* — Kilpatrick Townsend & Stockton LLP

(57) ABSTRACT

A touch screen system that can approximate tracking and dragging states regardless of the user's orientation and without reliance on direct sensing of touch pressure or area. A first detector generates a signal representing a first image of an object interacting with the touch screen. A second detector generates a signal representing a second image of the object. A signal processor processes the first signal to determine approximated coordinates of a first pair of outer edges of the object and processes the second signal to determine approximated coordinates of a second pair of outer edges of the object. The signal processor then calculates an approximated touch area based on the approximated coordinates of the first pair of outer edges and the approximated coordinates of the second pair of outer edges of the object. If the approximated touch area is less than or equal to a threshold touch area, the signal processor determines that the object interacting with the touch screen indicates a tracking state. If the approximated touch area is greater than the threshold touch area, the signal processor determines that the object interacting with the touch screen indicates a selection state. The threshold touch area may be established by calibrating the touch screen system when the object interacting with the touch screen is known to indicate the tracking state.

18 Claims, 6 Drawing Sheets

U.S. PATENT DOCUMENTS

| | | |
|---|---|---|
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,618 A | 1/1981 | Van Arnam |
| 4,243,879 A | 1/1981 | Carroll et al. |
| 4,247,767 A | 1/1981 | O'Brien et al. |
| 4,329,037 A | 5/1982 | Caviness |
| 4,420,261 A | 12/1983 | Barlow et al. |
| 4,459,476 A | 7/1984 | Weissmueller et al. |
| 4,468,694 A | 8/1984 | Edgar |
| 4,486,363 A | 12/1984 | Pricone et al. |
| 4,507,557 A | 3/1985 | Tsikos |
| 4,542,375 A | 9/1985 | Alles et al. |
| 4,550,250 A | 10/1985 | Mueller et al. |
| 4,553,842 A | 11/1985 | Griffin |
| 4,558,313 A | 12/1985 | Garwin et al. |
| 4,601,861 A | 7/1986 | Pricone et al. |
| 4,672,364 A | 6/1987 | Lucas |
| 4,673,918 A | 6/1987 | Adler et al. |
| 4,688,933 A | 8/1987 | Lapeyre |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,043,751 A | 8/1991 | Rice |
| 5,097,516 A | 3/1992 | Amir |
| 5,103,085 A | 4/1992 | Zimmerman |
| 5,103,249 A | 4/1992 | Keene |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,177,328 A | 1/1993 | Ito et al. |
| 5,179,369 A | 1/1993 | Person et al. |
| 5,196,835 A | 3/1993 | Blue et al. |
| 5,196,836 A | 3/1993 | Williams |
| 5,200,851 A | 4/1993 | Coderre et al. |
| 5,200,861 A | 4/1993 | Moskovich |
| 5,233,502 A | 8/1993 | Beatty et al. |
| 5,239,152 A | 8/1993 | Caldwell et al. |
| 5,239,373 A | 8/1993 | Tang et al. |
| 5,272,470 A | 12/1993 | Zetts |
| 5,317,140 A | 5/1994 | Dunthorn |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,541,372 A | 7/1996 | Baller et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,712,024 A | 1/1998 | Okuzaki et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,877,459 A * | 3/1999 | Prater ........................ 178/19.06 |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,936,615 A | 8/1999 | Waters |
| 5,936,770 A | 8/1999 | Nestegard et al. |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura et al. |
| 6,002,808 A | 12/1999 | Freeman |
| 6,008,798 A | 12/1999 | Mato, Jr. et al. |
| 6,015,214 A | 1/2000 | Heenan et al. |
| 6,020,878 A | 2/2000 | Robinson |
| 6,031,524 A | 2/2000 | Kunert |
| 6,031,531 A | 2/2000 | Kimble |
| 6,061,177 A | 5/2000 | Fujimoto |
| 6,067,080 A | 5/2000 | Holtzman |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |
| 6,161,066 A | 12/2000 | Wright et al. |
| 6,179,426 B1 | 1/2001 | Rodriguez, Jr. et al. |
| 6,188,388 B1 | 2/2001 | Arita et al. |
| 6,191,773 B1 | 2/2001 | Maruno et al. |

| | | | | | | |
|---|---|---|---|---|---|---|
| 6,208,329 B1 | 3/2001 | Ballare | | 6,690,397 B1 | 2/2004 | Daignault, Jr. |
| 6,208,330 B1 | 3/2001 | Hasegawa et al. | | 6,710,770 B2 | 3/2004 | Tomasi et al. |
| 6,209,266 B1 | 4/2001 | Branc et al. | | 6,714,311 B2 | 3/2004 | Hashimoto |
| 6,215,477 B1 | 4/2001 | Morrison et al. | | 6,720,949 B1 | 4/2004 | Pryor et al. |
| 6,222,175 B1 | 4/2001 | Krymski | | 6,727,885 B1 | 4/2004 | Ishino et al. |
| 6,226,035 B1 | 5/2001 | Korein et al. | | 6,736,321 B2 | 5/2004 | Tsikos et al. |
| 6,229,529 B1 | 5/2001 | Yano et al. | | 6,738,051 B2 | 5/2004 | Boyd et al. |
| 6,252,989 B1 | 6/2001 | Geisler et al. | | 6,741,250 B1 | 5/2004 | Furlan et al. |
| 6,256,033 B1 | 7/2001 | Nguyen | | 6,741,267 B1 | 5/2004 | Van Ieperen |
| 6,262,718 B1 | 7/2001 | Findlay et al. | | 6,747,636 B2 | 6/2004 | Martin |
| 6,285,359 B1 | 9/2001 | Ogasawara et al. | | 6,756,910 B2 | 6/2004 | Ohba et al. |
| 6,310,610 B1 | 10/2001 | Beaton et al. | | 6,760,009 B2 | 7/2004 | Omura et al. |
| 6,320,597 B1 | 11/2001 | Van Ieperen | | 6,760,999 B2 | 7/2004 | Branc et al. |
| 6,323,846 B1 | 11/2001 | Westerman et al. | | 6,767,102 B1 | 7/2004 | Heenan et al. |
| 6,326,954 B1 | 12/2001 | Van Ieperen | | 6,774,889 B1 | 8/2004 | Zhang et al. |
| 6,328,270 B1 | 12/2001 | Elberbaum | | 6,803,906 B1 | 10/2004 | Morrison et al. |
| 6,335,724 B1 | 1/2002 | Takekawa et al. | | 6,828,959 B2 | 12/2004 | Takekawa et al. |
| 6,337,681 B1 | 1/2002 | Martin | | 6,864,882 B2 | 3/2005 | Newton |
| 6,339,748 B1 | 1/2002 | Hiramatsu | | 6,909,425 B2 | 6/2005 | Matsuda et al. |
| 6,346,966 B1 | 2/2002 | Toh | | 6,911,972 B2 | 6/2005 | Brinjes |
| 6,352,351 B1 | 3/2002 | Ogasahara et al. | | 6,919,880 B2 | 7/2005 | Morrison et al. |
| 6,353,434 B1 | 3/2002 | Akebi et al. | | 6,927,384 B2 | 8/2005 | Reime et al. |
| 6,359,612 B1 | 3/2002 | Peter et al. | | 6,933,981 B1 | 8/2005 | Kishida et al. |
| 6,362,468 B1 | 3/2002 | Murakami et al. | | 6,947,029 B2 | 9/2005 | Katagiri et al. |
| 6,377,228 B1 | 4/2002 | Jenkin et al. | | 6,947,032 B2 | 9/2005 | Morrison et al. |
| 6,384,743 B1 | 5/2002 | Vanderheiden | | 6,952,202 B2 | 10/2005 | Hirabayashi |
| 6,406,758 B1 | 6/2002 | Bottari et al. | | 6,954,197 B2 | 10/2005 | Morrison et al. |
| 6,414,671 B1 | 7/2002 | Gillespie et al. | | 6,972,401 B2 | 12/2005 | Akitt et al. |
| 6,414,673 B1 | 7/2002 | Wood et al. | | 6,972,753 B1 | 12/2005 | Kimura et al. |
| 6,421,042 B1 | 7/2002 | Omura | | 7,002,555 B1 | 2/2006 | Jacobsen et al. |
| 6,427,389 B1 | 8/2002 | Branc et al. | | 7,007,236 B2 | 2/2006 | Dempski et al. |
| 6,429,856 B1 | 8/2002 | Omura et al. | | 7,015,418 B2 | 3/2006 | Cahill et al. |
| 6,429,857 B1 | 8/2002 | Masters et al. | | 7,030,861 B1 | 4/2006 | Westerman et al. |
| 6,480,187 B1 | 11/2002 | Sano et al. | | 7,057,647 B1 | 6/2006 | Monroe |
| 6,496,122 B2 | 12/2002 | Sampsell | | 7,058,204 B2 | 6/2006 | Hildreth et al. |
| 6,497,608 B2 | 12/2002 | Ho et al. | | 7,075,054 B2 | 7/2006 | Iwamoto et al. |
| 6,498,602 B1 | 12/2002 | Ogawa | | 7,084,857 B2 | 8/2006 | Lieberman et al. |
| 6,501,461 B2 | 12/2002 | Holtzman | | 7,084,868 B2 | 8/2006 | Farag et al. |
| 6,504,532 B1 | 1/2003 | Ogasahara et al. | | 7,098,392 B2 | 8/2006 | Sitrick et al. |
| 6,507,339 B1 | 1/2003 | Tanaka | | 7,113,174 B1 | 9/2006 | Takekawa et al. |
| 6,512,838 B1 | 1/2003 | Rafii et al. | | 7,121,470 B2 | 10/2006 | McCall et al. |
| 6,517,266 B2 | 2/2003 | Saund | | 7,133,032 B2 | 11/2006 | Cok |
| 6,518,600 B1 | 2/2003 | Shaddock | | 7,151,533 B2 | 12/2006 | Van Ieperen |
| 6,518,960 B2 | 2/2003 | Omura et al. | | 7,176,904 B2 | 2/2007 | Satoh |
| 6,522,830 B2 | 2/2003 | Yamagami | | 7,184,030 B2 | 2/2007 | McCharles et al. |
| 6,529,189 B1 | 3/2003 | Colgan et al. | | 7,187,489 B2 | 3/2007 | Miles |
| 6,530,664 B2 | 3/2003 | Vanderwerf et al. | | 7,190,496 B2 | 3/2007 | Klug et al. |
| 6,531,999 B1 | 3/2003 | Trajkovic | | 7,202,860 B2 | 4/2007 | Ogawa |
| 6,532,006 B1 | 3/2003 | Takekawa et al. | | 7,227,526 B2 | 6/2007 | Hildreth et al. |
| 6,537,673 B2 | 3/2003 | Sada et al. | | 7,230,608 B2 | 6/2007 | Cok |
| 6,540,366 B2 | 4/2003 | Keenan et al. | | 7,232,986 B2 | 6/2007 | Worthington et al. |
| 6,540,679 B2 | 4/2003 | Slayton et al. | | 7,236,132 B1 | 6/2007 | Lin et al. |
| 6,545,669 B1 | 4/2003 | Kinawi et al. | | 7,236,162 B2 | 6/2007 | Morrison et al. |
| 6,559,813 B1 | 5/2003 | DeLuca et al. | | 7,237,937 B2 | 7/2007 | Kawashima et al. |
| 6,563,491 B1 | 5/2003 | Omura | | 7,242,388 B2 | 7/2007 | Lieberman et al. |
| 6,567,078 B2 | 5/2003 | Ogawa | | 7,265,748 B2 | 9/2007 | Ryynanen |
| 6,567,121 B1 | 5/2003 | Kuno | | 7,268,692 B1 | 9/2007 | Lieberman |
| 6,570,103 B1 | 5/2003 | Saka et al. | | 7,274,356 B2 | 9/2007 | Ung et al. |
| 6,570,612 B1 | 5/2003 | Saund et al. | | 7,283,126 B2 | 10/2007 | Leung |
| 6,577,299 B1 | 6/2003 | Schiller et al. | | 7,283,128 B2 | 10/2007 | Sato |
| 6,587,099 B2 | 7/2003 | Takekawa | | 7,289,113 B2 | 10/2007 | Martin |
| 6,590,568 B1 | 7/2003 | Astala et al. | | 7,302,156 B1 | 11/2007 | Lieberman et al. |
| 6,594,023 B1 | 7/2003 | Omura et al. | | 7,305,368 B2 | 12/2007 | Lieberman et al. |
| 6,597,348 B1 | 7/2003 | Yamazaki et al. | | 7,330,184 B2 | 2/2008 | Leung |
| 6,597,508 B2 | 7/2003 | Seino et al. | | 7,333,094 B2 | 2/2008 | Lieberman et al. |
| 6,603,867 B1 | 8/2003 | Sugino et al. | | 7,333,095 B1 | 2/2008 | Lieberman et al. |
| 6,608,619 B2 | 8/2003 | Omura et al. | | 7,355,593 B2 | 4/2008 | Hill et al. |
| 6,614,422 B1 | 9/2003 | Rafii et al. | | 7,372,456 B2 | 5/2008 | McLintock |
| 6,624,833 B1 | 9/2003 | Kumar et al. | | 7,375,720 B2 | 5/2008 | Tanaka |
| 6,626,718 B2 | 9/2003 | Hiroki | | RE40,368 E | 6/2008 | Arnon |
| 6,630,922 B2 | 10/2003 | Fishkin et al. | | 7,411,575 B2 | 8/2008 | Hill et al. |
| 6,633,328 B1 | 10/2003 | Byrd et al. | | 7,414,617 B2 | 8/2008 | Ogawa |
| 6,650,318 B1 | 11/2003 | Arnon | | 7,432,914 B2 | 10/2008 | Kobayashi et al. |
| 6,650,822 B1 | 11/2003 | Zhou | | 7,460,110 B2 | 12/2008 | Ung et al. |
| 6,664,952 B2 | 12/2003 | Iwamoto et al. | | 7,477,241 B2 | 1/2009 | Lieberman et al. |
| 6,674,424 B1 | 1/2004 | Fujioka | | 7,479,949 B2 | 1/2009 | Jobs et al. |
| 6,683,584 B2 | 1/2004 | Ronzani et al. | | 7,492,357 B2 | 2/2009 | Morrison et al. |
| 6,690,357 B1 | 2/2004 | Dunton et al. | | 7,499,037 B2 | 3/2009 | Lube |
| 6,690,363 B2 | 2/2004 | Newton | | 7,515,138 B2 | 4/2009 | Sullivan |

| | | |
|---|---|---|
| 7,515,141 B2 | 4/2009 | Kobayashi |
| 7,522,156 B2 | 4/2009 | Sano et al. |
| 7,538,759 B2 | 5/2009 | Newton |
| 7,557,935 B2 | 7/2009 | Baruch |
| 7,559,664 B1 | 7/2009 | Walleman et al. |
| 7,619,617 B2 | 11/2009 | Morrison et al. |
| 7,629,967 B2 | 12/2009 | Newton |
| 7,692,625 B2 | 4/2010 | Morrison et al. |
| 7,751,671 B1 | 7/2010 | Newton et al. |
| 7,755,613 B2 | 7/2010 | Morrison et al. |
| 7,777,732 B2 * | 8/2010 | Herz et al. .................. 345/173 |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1 * | 12/2001 | Sano et al. .................. 345/175 |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 * | 2/2006 | Keely et al. .................. 345/619 |
| 2006/0034486 A1 | 2/2006 | Morrison et al. |
| 2006/0070187 A1 * | 4/2006 | Chilson .................. 7/160 |
| 2006/0132432 A1 | 6/2006 | Bell |
| 2006/0139314 A1 | 6/2006 | Bell |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 | 10/2006 | Tanaka et al. |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 * | 12/2006 | Rekimoto .................. 345/173 |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 * | 6/2007 | Chen et al. .................. 345/175 |
| 2007/0139932 A1 | 6/2007 | Sun et al. |
| 2007/0152984 A1 | 7/2007 | Ording et al. |
| 2007/0152986 A1 | 7/2007 | Ogawa |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0215451 A1 | 9/2007 | Sasloff et al. |
| 2007/0236454 A1 | 10/2007 | Ung et al. |
| 2007/0247435 A1 * | 10/2007 | Benko et al. .................. 345/173 |
| 2007/0273842 A1 | 11/2007 | Morrison et al. |
| 2008/0012835 A1 * | 1/2008 | Rimon et al. .................. 345/173 |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0143682 A1 | 6/2008 | Shim et al. |
| 2008/0150913 A1 | 6/2008 | Bell et al. |
| 2008/0158170 A1 * | 7/2008 | Herz et al. .................. 345/173 |
| 2008/0259050 A1 | 10/2008 | Lin et al. |
| 2008/0259052 A1 | 10/2008 | Lin et al. |
| 2009/0030853 A1 | 1/2009 | De La Motte |
| 2009/0058832 A1 | 3/2009 | Newton |
| 2009/0058833 A1 | 3/2009 | Newton |
| 2009/0077504 A1 | 3/2009 | Bell et al. |
| 2009/0135162 A1 | 5/2009 | Van De Wijdeven et al. |
| 2009/0141002 A1 | 6/2009 | Sohn et al. |
| 2009/0146972 A1 | 6/2009 | Morrison et al. |
| 2009/0207144 A1 | 8/2009 | Bridger |
| 2009/0213093 A1 | 8/2009 | Bridger |
| 2009/0213094 A1 | 8/2009 | Bridger |
| 2009/0219256 A1 | 9/2009 | Newton |
| 2009/0237376 A1 | 9/2009 | Bridger |

| | | | | | | |
|---|---|---|---|---|---|---|
| 2009/0278816 A1 | 11/2009 | Colson | | EP | 0843202 | 5/1998 |
| 2009/0284495 A1 | 11/2009 | Geaghan et al. | | EP | 0897161 | 2/1999 |
| 2009/0295755 A1 | 12/2009 | Chapman et al. | | EP | 0911721 | 4/1999 |
| 2009/0309844 A1 | 12/2009 | Woo et al. | | EP | 1059605 | 12/2000 |
| 2009/0309853 A1 | 12/2009 | Hildebrandt et al. | | EP | 1262909 | 12/2002 |
| 2010/0009098 A1 | 1/2010 | Bai et al. | | EP | 1297488 | 4/2003 |
| 2010/0045629 A1 | 2/2010 | Newton | | EP | 1420335 | 5/2004 |
| 2010/0045634 A1 | 2/2010 | Su et al. | | EP | 1450243 | 8/2004 |
| 2010/0079412 A1 | 4/2010 | Chiang et al. | | EP | 1457870 | 9/2004 |
| 2010/0085330 A1 | 4/2010 | Newton | | EP | 1471459 | 10/2004 |
| 2010/0090985 A1 | 4/2010 | Newton | | EP | 1517228 | 3/2005 |
| 2010/0090987 A1 | 4/2010 | Lin et al. | | EP | 1550940 | 7/2005 |
| 2010/0097353 A1 | 4/2010 | Newton | | EP | 1577745 | 9/2005 |
| 2010/0103143 A1 | 4/2010 | Newton et al. | | EP | 1599789 | 11/2005 |
| 2010/0177052 A1 | 7/2010 | Chang et al. | | EP | 1611503 | 1/2006 |
| 2010/0182279 A1 | 7/2010 | Juni | | EP | 1674977 | 6/2006 |
| 2010/0193259 A1 | 8/2010 | Wassvik | | EP | 1736856 | 12/2006 |
| 2010/0207911 A1 | 8/2010 | Newton | | EP | 1739528 | 1/2007 |
| 2010/0225588 A1 | 9/2010 | Newton et al. | | EP | 1739529 | 1/2007 |
| 2010/0229090 A1 | 9/2010 | Newton et al. | | EP | 1741186 | 1/2007 |
| 2010/0315379 A1 | 12/2010 | Allard et al. | | EP | 1759378 | 3/2007 |
| 2011/0019204 A1 | 1/2011 | Bridger | | EP | 1766501 | 3/2007 |
| 2011/0050649 A1 | 3/2011 | Newton et al. | | EP | 1830248 | 9/2007 |
| | | | | EP | 1877893 | 1/2008 |
| FOREIGN PATENT DOCUMENTS | | | | EP | 2135155 | 12/2009 |
| | | | | EP | 2195726 | 6/2010 |
| AU | 2003233728 | 12/2003 | | EP | 2250546 | 11/2010 |
| AU | 2004211738 | 8/2004 | | ES | 2279823 | 9/2007 |
| AU | 2006243730 | 11/2006 | | FR | 2521330 | 8/1983 |
| CA | 2058219 | 4/1993 | | GB | 1575420 | 9/1980 |
| CA | 2367864 | 4/1993 | | GB | 2176282 | 12/1986 |
| CA | 2219886 | 4/1999 | | GB | 2204126 | 11/1988 |
| CA | 2251221 | 4/1999 | | GB | 2263765 | 8/1993 |
| CA | 2267733 | 10/1999 | | JP | 57211637 | 12/1982 |
| CA | 2268208 | 10/1999 | | JP | 58146928 | 9/1983 |
| CA | 2252302 | 4/2000 | | JP | 61196317 | 8/1986 |
| CA | 2412878 | 1/2002 | | JP | 61260322 | 11/1986 |
| CA | 2341918 | 9/2002 | | JP | 62005428 | 1/1987 |
| CA | 2350152 | 12/2002 | | JP | 63223819 | 9/1988 |
| CA | 2386094 | 12/2002 | | JP | 1061736 | 3/1989 |
| CA | 2372868 | 8/2003 | | JP | 1154421 | 6/1989 |
| CA | 2390503 | 12/2003 | | JP | 3054618 | 3/1991 |
| CA | 2390506 | 12/2003 | | JP | 3244017 | 10/1991 |
| CA | 2432770 | 12/2003 | | JP | 4350715 | 12/1992 |
| CA | 2493236 | 12/2003 | | JP | 4355815 | 12/1992 |
| CA | 2448603 | 5/2004 | | JP | 5181605 | 7/1993 |
| CA | 2453873 | 7/2004 | | JP | 5189137 | 7/1993 |
| CA | 2460449 | 9/2004 | | JP | 5197810 | 8/1993 |
| CA | 2521418 | 10/2004 | | JP | 6110608 | 4/1994 |
| CA | 2481396 | 3/2005 | | JP | 7110733 | 4/1995 |
| CA | 2491582 | 7/2005 | | JP | 7160403 | 6/1995 |
| CA | 2563566 | 11/2005 | | JP | 7230352 | 8/1995 |
| CA | 2564262 | 11/2005 | | JP | 8016931 | 2/1996 |
| CA | 2501214 | 9/2006 | | JP | 8108689 | 4/1996 |
| CA | 2606863 | 11/2006 | | JP | 8506193 | 7/1996 |
| CA | 2580046 | 9/2007 | | JP | 8240407 | 9/1996 |
| CA | 2515955 | 1/2011 | | JP | 8315152 | 11/1996 |
| CN | 1277349 | 12/2000 | | JP | 9091094 | 4/1997 |
| CN | 1407506 | 4/2003 | | JP | 9224111 | 8/1997 |
| CN | 1440539 | 9/2003 | | JP | 9319501 | 12/1997 |
| CN | 1774692 | 5/2006 | | JP | 10031546 | 2/1998 |
| CN | 1784649 | 6/2006 | | JP | 10105324 | 4/1998 |
| CN | 1310126 | 4/2007 | | JP | 10162698 | 6/1998 |
| CN | 101019096 | 8/2007 | | JP | 10254623 | 9/1998 |
| CN | 101023582 | 8/2007 | | JP | 11045155 | 2/1999 |
| CN | 101663637 | 3/2010 | | JP | 11051644 | 2/1999 |
| CN | 101802759 | 8/2010 | | JP | 11064026 | 3/1999 |
| CN | 101802760 | 8/2010 | | JP | 11085376 | 3/1999 |
| DE | 3836429 | 5/1990 | | JP | 11110116 | 4/1999 |
| DE | 19810452 | 12/1998 | | JP | 11203042 | 7/1999 |
| DE | 60124549 | 9/2007 | | JP | 11212692 | 8/1999 |
| DE | 102007021537 | 6/2008 | | JP | 11338687 | 12/1999 |
| EP | 0125068 | 11/1984 | | JP | 2000105671 | 4/2000 |
| EP | 0181196 | 5/1986 | | JP | 2000132340 | 5/2000 |
| EP | 0279652 | 8/1988 | | JP | 2000259347 | 9/2000 |
| EP | 0347725 | 12/1989 | | JP | 2001014091 | 1/2001 |
| EP | 0420335 | 4/1991 | | JP | 2001075735 | 3/2001 |
| EP | 0657841 | 6/1995 | | JP | 2001142642 | 5/2001 |
| EP | 0762319 | 3/1997 | | JP | 2001282445 | 10/2001 |
| EP | 0829798 | 3/1998 | | | | |

| | | |
|---|---|---|
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO-2004/072843 | 8/2004 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO-2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO-2008/128096 A2 | 10/2008 |
| WO | WO2008128096 | 10/2008 |
| WO | WO-2008128096 A3 | 10/2008 |
| WO | WO2009029764 | 3/2009 |
| WO | WO2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Benko, et al., "Precise Selection Techniques for Multi-Touch Screens", Proc. ACM CHI 2006: Human Factors in Computer Systems, pp. 1263-1272.

Buxton, W., "Issues and Techniques in Touch-Sensitive Tablet Input," Computer Graphics, 19(3), Proceedings of SIGGRAPH '85, 1985, pp. 215-223.

"International Preliminary Report on Patentability", PCT/US2008/060102 Oct. 22, 2009.

Anon, "SMART Board Specifications Model 680i", XP7915047 Retrieved from the Internet: URL:http://www2.smarttech.com/kbdoc/74231 [retrieved on Sep. 23, 2010] the whole document, 2008, pp. 1-5.

Benko, et al., "Precise Selection Techniques for Multi-Touch Screens", *Conference on Human Factors in Computing Systems—Proceedings* 2006, 2: 1263-1273.

Buxton, et al., "Issues and Techniques in Touch-Sensitive Tablet Input", *Computer Graphics, Proceedings of SIGGRAPH'85*, 1985, 19(3): 215-223.

Canadian Patent Application No. 2412878, Office Action, mailed May 12, 2009, 4 pages.

"Composite List of Projects 1983 to 1989", *NASA Small Business Innovation Research Program*, Aug. 1990, 132 pages.

"Digital Vision Touch Technology", White Paper, *SMART Technologies Inc.*, Feb. 2003, 10 pages.

European Application No. 02253594.2, European Search Report, mailed Jan. 5, 2006, 3 pages.

European Application No. 03257166.3, Partial European Search Report, mailed May 29, 2006, 4 pages.

European Application No. 04251392.9, European Search Report, mailed Jan. 18, 2007, 3 pages.

European Application No. 04711522.5, Office Action, mailed Jun. 29, 2010, 8 pages.

European Application No. 04711522.5, Office Action, mailed Mar. 22, 2010, 1 page.

European Application No. 04711522.5, Supplementary European Search Report, mailed Mar. 3, 2010, 3 pages.

European Application No. 06019268.9, European Search Report and Search Opinion, mailed Nov. 24, 2006, 5 pages.

European Application No. 06019269.7, European Search Report and Search Opinion, mailed Nov. 23, 2006, 5 pages.

European Application No. 07250888.0, European Search Report and Search Opinion, mailed Jun. 22, 2007, 6 pages.

European Application No. 07701682.2, Supplementary European Search Report and Search Opinion, mailed Dec. 7, 2010, 10 pages.

European Application No. 08745663.8, Office Action, mailed Dec. 27, 2010, 13 pages.

European Application No. 08745663.8, Office Action, mailed Jul. 6, 2010, 6 pages.

Förstner, "On Estimating Rotations", *Institut für Photogrammetrie, Universität Bonn*, 12 pages.

Fukushige, et al., "Interactive 3D Pointing Device Using Mirror Reflections", *Graduate School of Engineering*, Osaka University, 2006, 231-235.

Funk, "CCDs in optical touch panels deliver high resolution", *Electronic Design*, Sep. 27, 1980, pp. 139-143.

Geer, "Will Gesture—Recognition Technology Point the Way?", *Industry Trends*, Oct. 20-23, 2004.

Hartley, "Multiple View Geometry in Computer Vision", *Cambridge University Press* First published 2000, Reprinted (with corrections) 2001, pp. 70-73, 92-93, and 98-99.

Heddier Electronic, "Store Window Presentations", Feb. 2, 2011, 2 pages.

Herot, et al., "One-Point Touch Input of Vector Information for Computer Displays", *Architecture Machine Group Massachusetts Institute of Technology* Cambridge, Massachusetts, Oct. 31, 1977, pp. 210-216.

Hu, et al., "Multiple-view 3-D Reconstruction Using a Mirror", *The University of Rochester*, May 2005, 14 pages.
International Application No. PCT/CA2001/00980, International Search Report, mailed Oct. 22, 2001, 3 pages.
International Application No. PCT/CA2004/001759, International Search Report and Written Opinion, mailed Feb. 21, 2005, 7 pages.
International Application No. PCT/CA2007/002184, International Search Report, mailed Mar. 13, 2008, 3 pages.
International Application No. PCT/CA2008/001350, International Search Report, mailed Oct. 17, 2008, 5 pages.
International Application No. PCT/CA2009/000733, International Search Report and Written Opinion, mailed Sep. 10, 2009, 6 pages.
International Application No. PCT/CA2010/001085, International Search Report, mailed Oct. 12, 2010, 4 pages.
International Application No. PCT/NZ2004/000029, International Preliminary Report on Patentability, issued May 20,2005, 21 pages.
International Application No. PCT/NZ2004/000029, International Search Report and Written Opinion, mailed Jun. 10, 2004, 6 pages.
International Application No. PCT/NZ2005/000092, International Preliminary Report on Patentability, completed Dec. 30, 2006, 3 pages.
International Application No. PCT/NZ2005/000092, International Search Report, mailed Sep. 27, 2006, 4 pages.
International Application No. PCT/NZ2010/000049, International Search Report and Written Opinion, mailed Oct. 14, 2010, 12 pages.
International Application No. PCT/NZ2010/000051, International Search Report and Written Opinion, mailed Oct. 5, 2010, 15 pages.
International Application No. PCT/US2008/060102, International Preliminary Report on Patentability, mailed Oct. 22, 2009, 10 pages.
International Application No. PCT/US2008/060102, International Search Report and Written Opinion, mailed Feb. 12, 2009, 20 pages.
International Application No. PCT/US2008/074749, International Preliminary Report on Patentability, issuance Mar. 2, 2010, 9 pages.
International Application No. PCT/US2008/074749, International Search Report and Written Opinion, mailed Feb. 11, 2009, 15 pages.
International Application No. PCT/US2008/074755, International Preliminary Report on Patentability, issuance Mar. 2, 2010, 8 pages.
International Application No. PCT/US2008/074755, International Search Report and Written Opinion, mailed Jan. 29, 2009, 8 pages.
International Application No. PCT/US2009/030694, International Preliminary Report on Patentability, completion Apr. 26, 2010, 10 pages.
International Application No. PCT/US2009/030694, International Search Report, mailed Aug. 5, 2009, 5 pages.
International Application No. PCT/US2009/033624, International Preliminary Report on Patentability and Written Opinion, issuance Aug. 17, 2010, 6 pages.
International Application No. PCT/US2009/033624, International Search Report, mailed Mar. 29, 2010, 3 pages.
International Application No. PCT/US2009/042547, International Preliminary Report on Patentability, mailed Nov. 9, 2010, 6 pages.
International Application No. PCT/US2009/042547, International Search Report and Written Opinion, mailed Sep. 2, 2010, 12 pages.
International Application No. PCT/US2009/058682, International Search Report and Written Opinion, mailed Apr. 27, 2010, 15 pages.
International Application No. PCT/US2009/059193, International Search Report and Written Opinion, mailed Dec. 7, 2009, 15 pages.
International Application No. PCT/US2010/059050, International Search Report and Written Opinion, mailed Mar. 23, 2011, 9 pages.
International Application No. PCT/US2010/059104, International Search Report and Written Opinion, mailed Jun. 6, 2011, 14 pages.
"Introducing the NextWindow 1900 Optical Touch Screen", *A NextWindow White Paper, Next Window Human Touch*, May 22, 2007, 13 pages.
Intuiface Press Release, "IntuiLab introduces IntuiFace, an interactive table and its application platform", Nov. 30, 2007, 1 page.
Intuilab, "Overview Page", Mar. 9, 2011, 1 page.
Japanese Patent Application No. 2005-000268, Office Action, mailed Jul. 5, 2010, Office Action—3 pages, English Translation—3 pages.
Japanese Patent Application No. 2006-502767, Office Action, mailed Jan. 20, 2009, Office Action—2 pages, English Translation—3 pages.
Japanese Patent Application No. 2006-502767, Office Action, mailed Jun. 22, 2010, Office Action—3 pages, English Translation—pages.
Japanese Patent Application No. 2007-511305, Office Action, mailed Feb. 1, 2011, Office Action—2 pages, English Translation—5 pages.
Kanatani, "Camera Calibration", *Geometric Computation for Machine Vision*, Oxford Engineering Science Series, 1993, 37(2): 56-63.
Korean Patent Application No. 10-2005-7014885, Office Action, dated Aug. 9, 2010, English Translation—5 pages.
Lane, et al., "Reflective Interaction in Virtual Environments", *Eurographics*, 2001, 20(3): 7 pages.
Lo, "Solid-state image sensor: technologies and applications", SPIE Proceedings, 1998, 3422: 70-80.
Loinaz, et al., "A 200-mW, 3.3-V, CMOS Color Camera IC Producing 352 × 288 24-b Video at 30 Frames", *IEEE Journal of Solid-State Circuits*, Dec. 1998, 33(12); 2092-2103.
Pogue, "The Multi-Touch Screen", *Pogue's Posts*, Mar. 27, 2007, 13 pages.
Singapore Patent Application No. 201001122-9, Office Action, dated May 3, 2011, 9 pages.
Tapper, et al., "On-Line Handwriting Recognition—A Survey", *Proceedings of the $9^{th}$ International Conference on Pattern Recognition (ICPR)*, Rome, IEEE Computer Society Press, Nov. 14-17, 1988, 2: 1123-1132.
"ThruGlass™ Projected Capacitive Touchscreens Specifications", *Micro Touch*, 2000, 4 pages.
"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol: 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol. 5, Nos. 2-3.
"Touch Panel", *Veritas et Visus*, Nov. 2010, vol. 5, No. 4.
Photobit Corporation, "VGA-format CMOS Camera-on-a-Chip for Multimedia Applications", 1999, 2 pages.
Villamor, et al., "Touch Gesture Reference Guide", Last updated Apr. 15, 2010; 7 pages.
Wang, et al., "Stereo camera calibration without absolute world coordinate information", *SPIE*, Jun. 14, 1995, 2620: 655-662.
Wrobel, et al., "Minimum Solutions for Orientation", *Calibration and Orientation of Cameras in Computer Vision, Springer Series in Information Sciences*, 2001, 34: 28-33.
Chinese Patent Application No. 200880105040.5, Office Action, at least as early as Aug. 11, 2011, 6 pages.
Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.
International Application No. PCT/US2010/059078, International Search Report and Written Opinion, mailed Aug. 2, 2011, 17 pages.
Piccardi, et al., "Background subtraction techniques: a review", *2004 IEEE International Conference on Systems, Man and Cybernetics*, Oct. 10, 2004, 4: 3099-3104.

\* cited by examiner

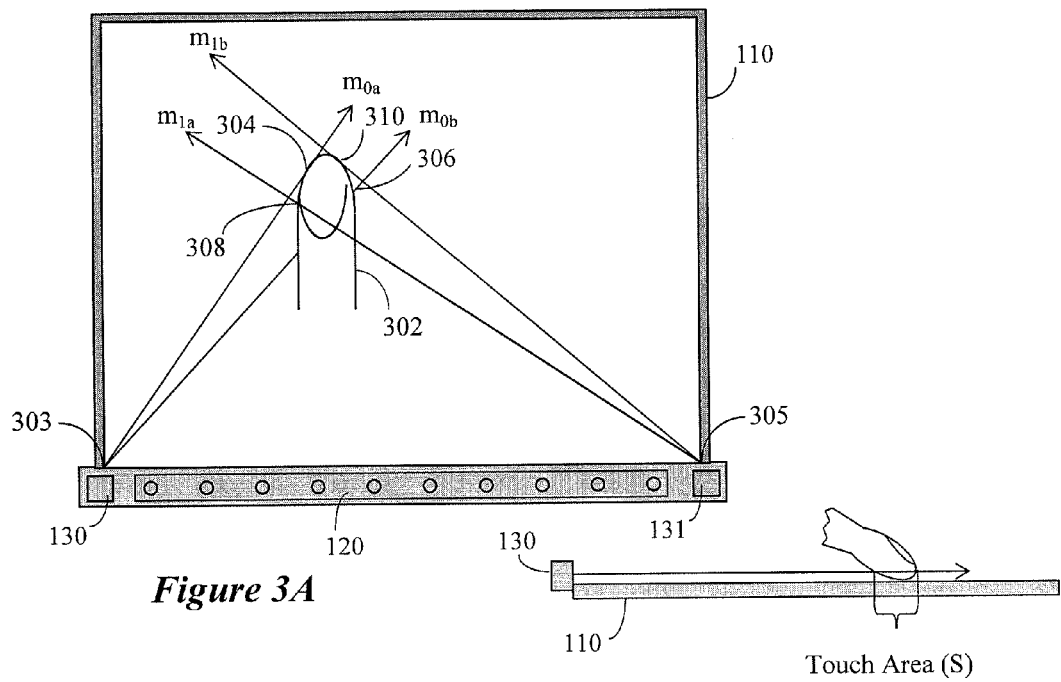
*Figure 3A*
*Figure 3B*
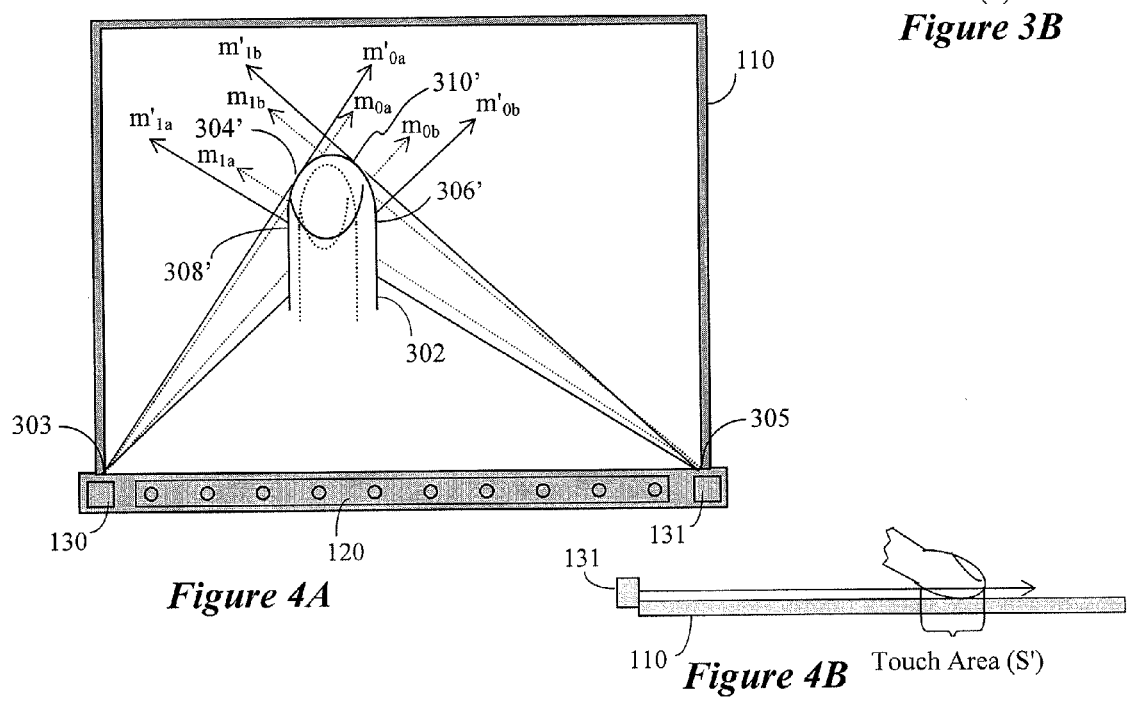
*Figure 4A*
*Figure 4B*

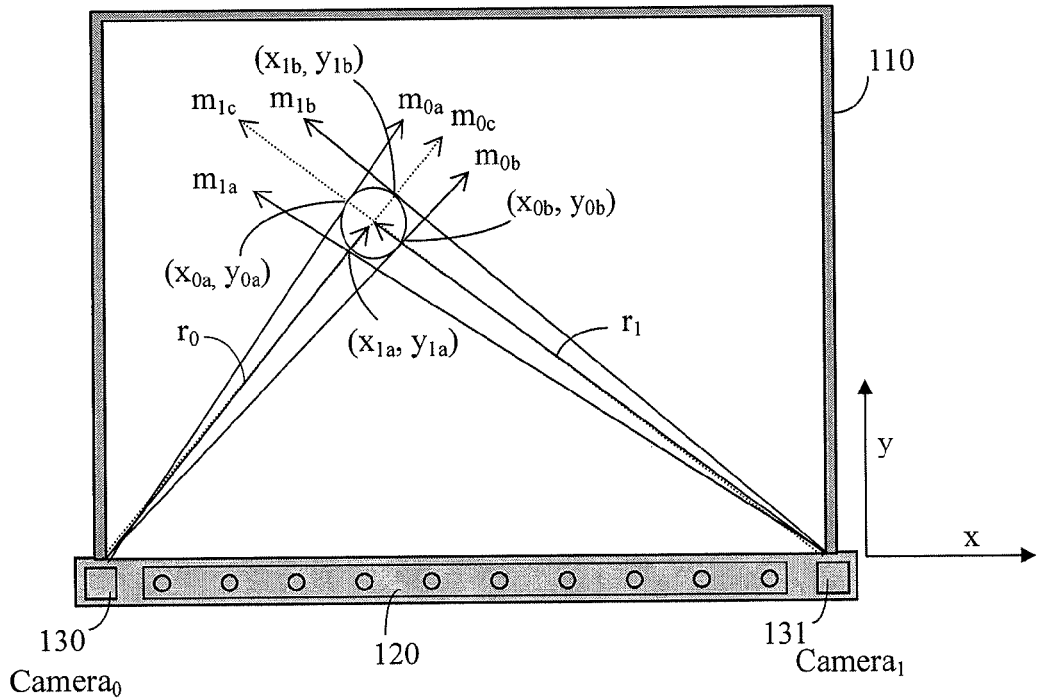
*Figure 5*
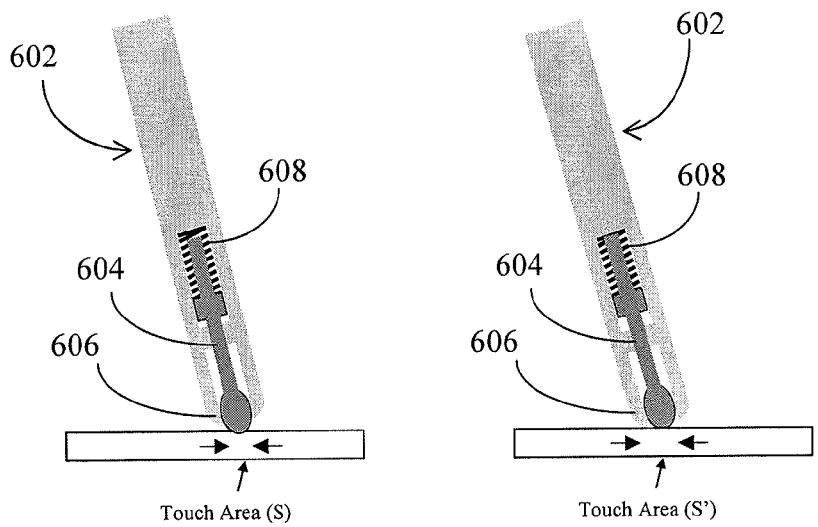
*Figure 6A*  *Figure 6B*

TOUCH SCREEN SYSTEM WITH HOVER AND CLICK INPUT METHODS

RELATED APPLICATIONS

This application claims priority to New Zealand Provisional Patent Application No. 554,416, entitled "Touch Screen with Hover and Click Input Methods," which was filed in the New Zealand Patent Office on Apr. 11, 2007.

TECHNICAL FIELD

The present invention relates generally to touch sensitive screens, also referred to as touch screens. More particularly, the present invention relates to systems and methods for using signal processing to optically detect user interactions with a touch screen representing tracking, selecting and dragging operations.

BACKGROUND OF THE INVENTION

Touch screen systems of the prior art can be categorized into the following technology groups: resistive, surface capacitive, projected capacitive, surface acoustic wave (SAW), infrared (IR), Frustrated Total Internal Reflection (FTIR), optical, and dispersive signal (bending wave). Each type of touch screen technology has its own features, advantages and disadvantages. With all such technologies, the size of human fingers and the lack of sensing precision can make precise touch screen interactions difficult. Most conventional touch screen systems do not address the needs of current user interfaces that require at least four different interaction states: (1) out-of-range; (2) tracking (also known as "hover" or "proximity"); (3) selection (also known as "click"); and (4) dragging.

By way of contrast, traditional computer input devices, such as mice, pens and touch pads, allow a user to perform tracking, dragging and selection operations. A mouse, for example, allows a user to track a cursor around a display computer screen independently from clicking a button to make a selection, or to perform a dragging operation by maintaining a button in a depressed state when manipulating the mouse. Pens and touch pads have the ability to directly measure contact pressure and thus use detected changes in pressure over time to distinguish between tracking, dragging and selection operations. The ability to position the cursor and then optionally press or trigger a button is important in many software applications and allows a more precise input mode. There is therefore a general need for such functionality in the field of touch screen technology.

In order to detect tracking and dragging states, any touch screen system must be able to continuously detect and report the position of the user's finger or stylus. However, most conventional touch screen systems register a selection (i.e., a "click") only when contact between the user's finger or stylus and the touch screen surface is either established or broken, and thus do not provide for separate tracking or dragging operations. As one exception, Benko et al. have demonstrated in their paper entitled *Precise Selection Techniques for Multi-Touch Screens* (*Proc. ACM CHI* 2006: *Human Factors in Computing Systems*, pp. 1263-1272), that an FTIR touch screen system, which directly senses the area of a touch, can be adapted to detect variations in the area of the touch over time in order to approximate tracking and dragging states. The technique described by Benko et al. is referred to as SimPress and is said to reduce motion errors during clicking and allow the simulation of a hover state on devices unable to sense proximity.

The SimPress technique is similar to that used by pressure-sensitive touch pads and pen interfaces for computers. All of these technologies require the ability to directly sense the pressure or area of a touch (i.e., the surface area of the touch screen contacted by a finger or stylus) and thus are not applicable in touch screen systems that lack such ability, including infrared touch screen systems and optical touch screen systems. In addition, due to the manner in which variations in touch area are calculated, the SimPress technique only works if the user always approaches the tabletop touch screen from the same direction. What is needed, therefore, is a touch screen system that can approximate tracking and dragging states, regardless of the user's orientation and without reliance on direct sensing of touch pressure or area.

Infrared touch screen technology relies on the interruption of an infrared light grid that is positioned in front of the display screen. A "touch frame" or "opto-matrix frame" typically contains a row of infrared LEDs and a row of photo transistors; each mounted on two opposite sides to create a grid of invisible infrared light. The frame assembly is comprised of printed wiring boards on which the opto-electronics are mounted and is concealed behind an infrared-transparent bezel. The bezel shields the opto-electronics from the operating environment while allowing the infrared beams to pass through.

An infrared controller sequentially pulses the LEDs to create a grid of infrared light beams. When a stylus or finger enters the grid, it obstructs some of the light beams. One or more phototransistors detect the absence of light and transmit a signal that can be used to identify the x and y coordinates of the touch. Infrared touch screen systems are often used in manufacturing and medical applications because they can be completely sealed and operated using any number of hard or soft objects. The major issue with infrared touch screen systems is that the "seating" of the touch frame is slightly above the screen. Consequently, the touch screen is susceptible to "early activation" before the finger or stylus has actually touched the screen. The cost to manufacture the infrared bezel is also quite high.

Optical touch screen systems rely on a combination of line-scan or area image cameras, digital signal processing, front or back illumination and algorithms to determine a point of touch. Many optical touch screen systems use line-scanning cameras, orientated along the touch screen surface so as to image the bezel. In this way, the system can track the movement of any object close to the surface of the touch screen by detecting variations in illumination emitted by an illumination source, such as an infrared light source. For example, infrared light may be emitted across the surface of the touch screen either by infrared light emitting diodes (IR-LED) or by special reflective surfaces. Optical touch screen technology shares some of the advantages and disadvantages of infrared touch screen technology. One such disadvantage is that touches are typically registered just before the finger or object actually touches the touch screen surface. The most significant advantages of optical touch screen technology include lower incremental cost as size increases and substantially higher resolution and data rate, which translate into much better drag-and-drop performance.

SUMMARY OF THE INVENTION

The present invention provides a touch screen system for discerning between user interaction states. The inventive touch screen system can approximate tracking and dragging states, regardless of the user's orientation and without reliance on direct sensing of touch pressure or area. The touch screen system includes a touch screen, at least two detectors in proximity to the touch screen and a signal processor. The detectors may be line scan camera, area scan cameras or phototransistors. The touch screen system will typically include a light source for illuminating the object. The detectors will detect illumination level variations caused by an object interacting with the touch screen.

A first detector generates a first signal representing a first image of an object interacting with the touch screen. A second detector generates a second signal representing a second image of the object interacting with the touch screen. The signal processor for executing computer-executable instructions for processing the first signal to determine approximated coordinates of a first pair of outer edges of the object and processing the second signal to determine approximated coordinates of a second pair of outer edges of the object. For example, the approximated coordinates may be determined using slope line calculations.

The signal processor then calculates an approximated touch area based on the approximated coordinates of the first pair of outer edges and the approximated coordinates of the second pair of outer edges of the object. If the approximated touch area is less than or equal to a threshold touch area, the signal processor determines that the object interacting with the touch screen indicates a tracking state. If the approximated touch area is greater than the threshold touch area, the signal processor determines that the object interacting with the touch screen indicates a selection state. The threshold touch area may be established by calibrating the touch screen system when the object interacting with the touch screen is known to indicate the tracking state.

If the object interacting with the touch screen indicates the selection state, the signal processor monitors subsequent signals from the detectors to determine whether the object moves relative to the touch screen. If the object moves relative to the touch screen, the signal processor re-calculates the approximated touch area and determines whether the re-calculated touch area remains greater than or equal to the threshold touch area. If so, the signal processor determines that the object interacting with the touch screen indicates a dragging state. If not, the signal processor determines that the object interacting with the touch screen indicates the tracking state. If the object interacting with the touch screen indicates either the selection state, the dragging state or the tracking state, the signal processor determines whether the object becomes undetected by the first detector and the second detector. If so, the signal processor determines that the object interacting with the touch screen indicates an out-of-range state.

The object interacting with the touch screen may be a finger, stylus or other object capable of producing a first touch area and a relatively larger second touch area. For example, the object may comprise a stylus having a spring loaded plunger protruding from a tip of the stylus, where the plunger produces a relatively small touch area when interacting with the touch screen. The plunger collapses into the tip of the stylus when sufficient compression is applied to the spring, causing the tip of the stylus to contact the touch screen and producing a relatively larger touch area. These and other aspects and features of the invention will be described further in the detailed description below in connection with the appended drawings and claims.

BRIEF DESCRIPTION OF THE DRAWINGS

FIG. 3, comprising FIG. 3A and FIG. 3B, is an illustration of a finger interacting with a touch screen in tracking mode, in accordance with certain exemplary embodiments of the present invention.

FIG. 4, comprising FIG. 4A and FIG. 4B, is an illustration of a finger interacting with a touch screen in selection mode, in accordance with certain exemplary embodiments of the present invention.

FIG. 5 is a reference diagram shown to provide an understanding of exemplary trigonometric calculations that can be used to approximate touch area in accordance with certain exemplary embodiments of the present invention.

FIG. 6, comprising FIG. 6A and FIG. 6B, is an illustration of a specialized stylus, which may be used in accordance with certain exemplary embodiments of the present invention.

DETAILED DESCRIPTION OF EXEMPLARY EMBODIMENTS OF THE INVENTION

Figure 1:
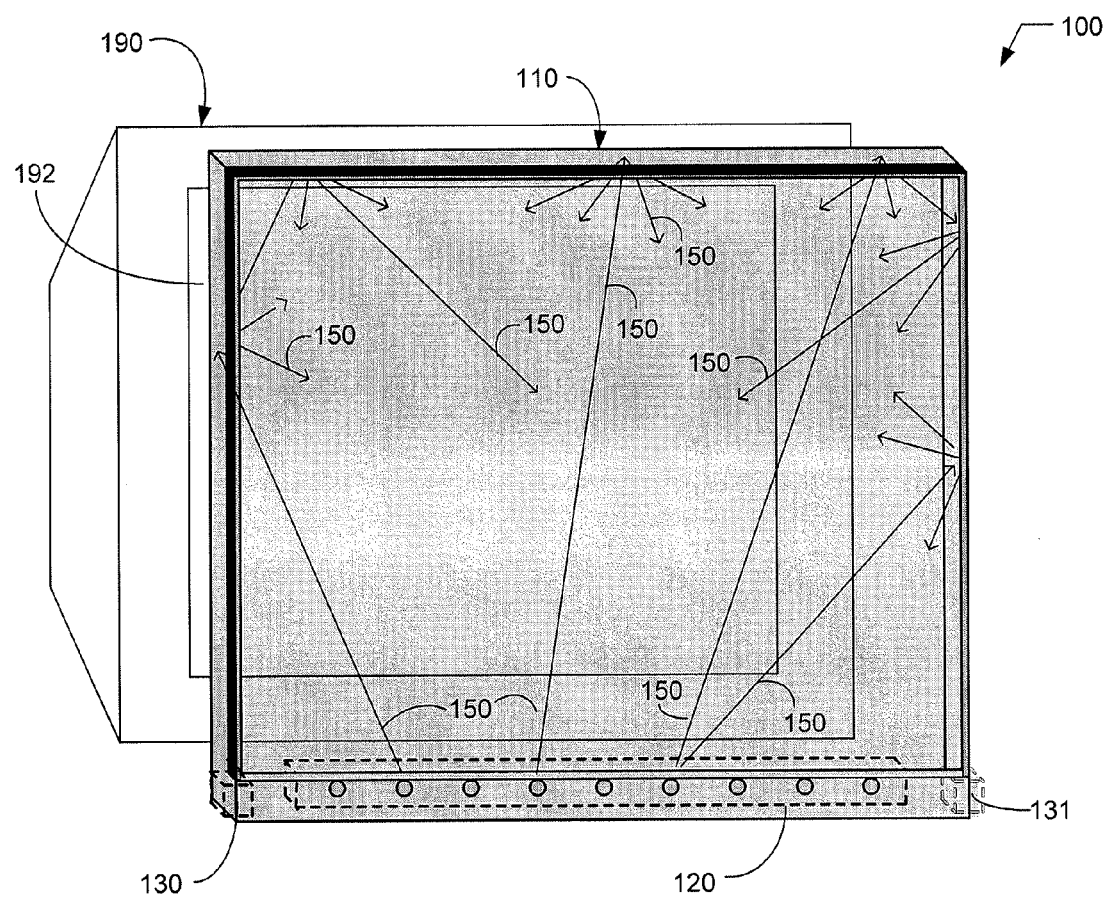
FIG. 1 is an illustration of a touch screen system, in accordance with certain exemplary embodiments of the present invention.

The present invention provides touch screen systems and methods for approximating at least four interaction states: (1) out-of-range; (2) tracking; (3) selection; and (4) dragging. The systems and methods of the present invention provide functionality for discerning between the various interaction states regardless of the orientation of the user's finger, stylus or other touch object and without reliance on direct sensing of touch pressure or area. Exemplary embodiments of the present invention will hereinafter be described with reference to the drawings, in which like reference numerals represent like elements throughout the several figures.

FIG. 1 is an illustration of an exemplary touch screen system 100. As used herein, the term "touch screen system" is meant to refer to a touch screen 110 and the hardware and/or software components that provide touch detection functionality. The exemplary touch screen system 100 is shown adjacent to a display device (i.e., video monitor) 190. The display device 190 may be interfaced to a personal computer or other computing device (see FIG. 2), which may execute software for detecting touches on or near the touch screen 110. The illustration in FIG. 1 of the touch screen system 100 adjacent to the display device 190 represents an exemplary application of the touch screen system 100. For example, the touch screen system 100 may be positioned and/or secured in front of the display device 190, so that a user can view and interact with the visual output of the display device 190 through the touch screen 110.

Thus, the touch screen system 100 may have over-lay or retrofit applications for existing display devices 190. However, it should be understood that other applications of the exemplary touch screen system 100 are contemplated by the present invention. For example, the touch screen system 100 may be applied as an integrated component of a display device 190 and may, in that regard, also function as a display screen for the display device 190. The exemplary touch screen system 100 may be used in conjunction with display devices 190 of all sizes and dimensions, including but not limited to the display screens of small handheld devices, such as mobile phones, personal digital assistants (PDA), pagers, etc.

At least a portion of the touch screen 110 is typically transparent and/or translucent, so that images or other objects can be viewed through the touch screen 110 and light and/or other forms of energy can be transmitted within or through the touch screen 110 (e.g., by reflection or refraction). For example, the touch screen 110 may be constructed of a plastic or thermoplastic material (e.g., acrylic, Plexiglass, polycarbonate, etc.) and/or a glass type of material. In certain embodiments, the touch screen may be polycarbonate or a glass material bonded to an acrylic material. The touch screen 110 may also be constructed of other materials, as will be apparent to those skilled in the art. The touch screen 110 may also be configured with a durable (e.g., scratch and/or shatter resistant) coating. The touch screen 110 may or may not include a frame or bezel, i.e., a casing or housing that surrounds the perimeter of the touch screen 110.

The touch screen system 100 includes an energy source 120 that is configured to emit energy, for example, in the form of pulses, waves, beams, etc. (generally referred to herein as "energy beams" for simplicity). The energy source 120 is typically positioned within or adjacent (e.g., in proximity) to one or more edge of the touch screen 110. The energy source 120 may emit one or more of various types of energy. For example, the energy source 120 may emit infrared (IR) energy. Alternately, the energy source 120 may emit visible light energy (e.g., at one or more frequencies or spectrums).

The energy source 120 may include one or more separate emission sources (emitters, generators, etc.) For example, the energy source 120 may include one or more infrared light emitting diodes (LEDs). As another example, the energy source 120 may include one or more microwave energy transmitters or one or more acoustic wave generators. The energy source 120 is positioned and configured such that it emits energy beams 140 across the surface of the touch screen 110, so as to create an energized plane adjacent to the touch screen surface. For example, suitable reflective or refractive components (such as reflective tape, paint, metal or plastic, mirrors, prisms, etc.) may be used to form and position the energized plane.

Energy beams 150 that are reflected across the front surface 111 of the touch screen 110 are detected by detectors 130, 131. These detectors 130, 131 may be configured to monitor and/or detect variations (changes, etc.) in the energy beams 150. Depending upon the orientation of the energy source 120 and the detectors 130, 131, the energy beams 150 may either have a "back-lighting" or "fore-lighting" effect on a finger, stylus, or other object that touches the touch screen 110. In a backlighting scenario, a touch on or near the front surface of the touch screen 110 may cause a level of interruption of the reflected energy beams 150 such that the touch location appears as a shadow or silhouette (i.e., absence of energy) when detected by the detectors 130, 131. In a fore-lighting scenario, energy reflected by the finger, stylus or other object will appear to the detectors 130, 131 as an area of increased energy intensity.

In some embodiments, filtering may be employed by the detectors 130, 131 and/or software in order to enhance the detection of energy beam intensity variations. However, the contrast of intensities between the energy beams 150 and surrounding noise may be sufficient to negate the need for filtering. Information signals generated by the detectors 130, 131 may be processed by a video processing unit (e.g., a digital signal processor) and/or a computing device, as discussed below with reference to see FIG. 2.

The detectors 130, 131 may be positioned within or adjacent (e.g., in proximity) to the touch screen 110 such that they can monitor and or detect the energy beams 150 in the energized plane that is adjacent to the touch screen surface. Reflectors and/or prisms can be used, as or if needed, depending on the location of the detectors 130, 131, to allow the detectors 130, 131 to detect the energy beams 150. In the example shown in FIG. 1, the detectors 130, 131 are positioned within or along the bottom edge of the touch screen 110, one in each corner. At least two spaced apart detectors are included in preferred embodiments, so that the location of a touch can be determined using triangulation techniques, as described below.

A detector 130, 131 can be any device that is capable of detecting (e.g., imaging, monitoring, etc.) variations in the energy beams 150 reflected across the front surface of the touch screen 110. For example, a suitable detector 130, 131 may be one of various types of cameras, such as an area scan or line scan (e.g., digital) camera. Such an area scan or line scan camera may be based on complementary metal oxide semiconductor (CMOS) or charge coupled device (CCD) technologies, which are known in the art. Furthermore, monochrome (e.g., gray-scale) cameras may be sufficient because the detectors 130, 131 do not need to acquire detailed color images.

While cameras generally are more expensive than other types of detector devices that can be used in touch screen systems 100, such as photo-detectors (e.g., photo-diodes or photo-transistors), they allow greater accuracy for touch detection. As known in the art, area scan or line scan cameras (particularly those with monochrome capability) are typically less expensive than cameras configured to acquire detailed images and/or that have color detection capability. Thus, relatively cost effective area scan or line scan cameras can provide the touch screen system 100 with accurate touch screen capability. However, it should be understood that other devices may be used to provide the functions of the detectors 130, 131 in accordance with other embodiments of the invention.

Accordingly, the touch screen system 100 of the present invention is configured to detect a touch (e.g., by a finger, stylus, or other object) based on detected variations in energy beams 150 that form an energized plane adjacent to the touch screen surface. The energy beams 150 are monitored by the detectors 130, 131. The detectors 130, 131 may be configured to detect variation (e.g., a decrease or increase) in the intensity of the energy beams 150. As will be appreciated by those of ordinary skill in the art, the required output capacity of the energy source 120 to allow adequate detection by the detectors may be based on various factors, such as the size of the touch screen 110, the expected losses within the touch screen system 100 (e.g., 1/distance$^2$ losses) and due to and the surrounding medium (e.g., air), speed or exposure time characteristics of the detectors 110, ambient light characteristics, etc. As will be discussed with respect to subsequent figures, the detectors 130, 131 transmit data regarding the energy beams 150 (or variation therein) to a computing device (not depicted) that executes software for processing said data and calculating the location of a touch relative to the touch screen 110.

Figure 2:
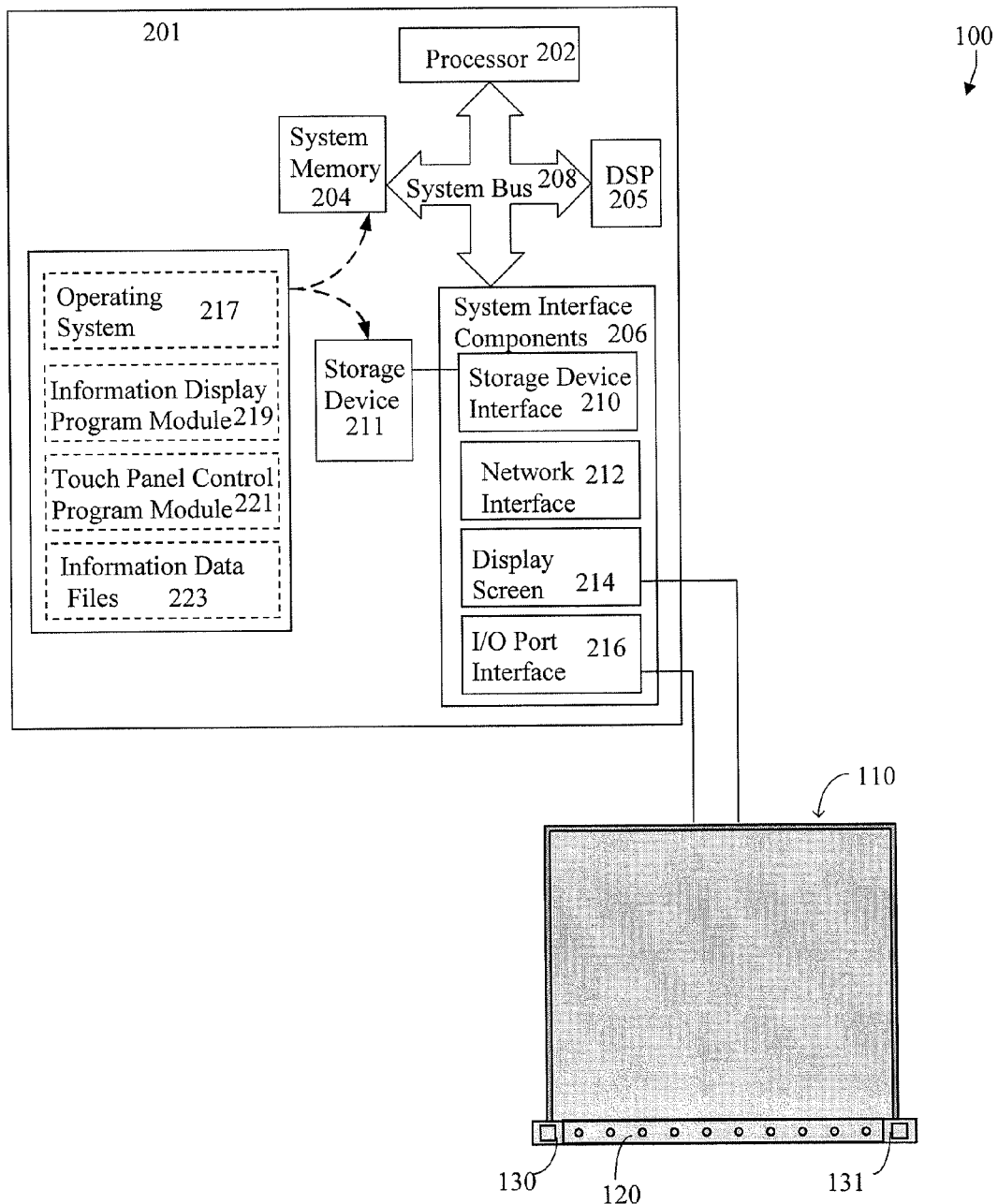
FIG. 2 is a block diagram of touch screen system components, including a computing device, in accordance with certain exemplary embodiments of the present invention.

FIG. 2 is a block diagram illustrating the exemplary touch screen system 100 interfaced to an exemplary computing device 201 in accordance with certain exemplary embodiments of the present invention. The computing device 201 may be functionally coupled to a touch screen system 100, either by a hardwire or wireless connection. The exemplary computing device 201 may be any type of processor-driven device, such as a personal computer, a laptop computer, a handheld computer, a personal digital assistant (PDA), a digital and/or cellular telephone, a pager, a video game device, etc. These and other types of processor-driven devices will be apparent to those of skill in the art. As used in this discussion, the term "processor" can refer to any type of programmable logic device, including a microprocessor or any other type of similar device.

The computing device 201 may include, for example, a processor 202, a system memory 204, and various system interface components 206. The processor 202, system memory 204, a digital signal processing (DSP) unit 205 and system interface components 206 may be functionally connected via a system bus 208. The system interface components 206 may enable the processor 202 to communicate with peripheral devices. For example, a storage device interface 210 can provide an interface between the processor 202 and a storage device 211 (e.g., removable and/or non-removable), such as a disk drive. A network interface 212 may also be provided as an interface between the processor 202 and a network communications device (not shown), so that the computing device 201 can be connected to a network.

A display screen interface 214 can provide an interface between the processor 202 and a display device 190 (shown in FIG. 1). The touch screen 110 of the touch screen system 100 may be positioned in front of or otherwise attached or mounted to a display device 190 having its own display screen 192. Alternately, the touch screen 110 may functions as the display screen 192 of the display device 190. One or more input/output ("I/O") port interfaces 216 may be provided as an interface between the processor 202 and various input and/or output devices. For example, the detectors 130, 131 or other suitable components of the touch screen system 100 may be connected to the computing device 201 via an input port and may provide input signals to the processor 202 via an input port interface 216. Similarly, the energy source 120 of the touch screen system 100 may be connected to the computing device 201 by way of an output port and may receive output signals from the processor 202 via an output port interface 216.

A number of program modules may be stored in the system memory 204 and/or any other computer-readable media associated with the storage device 211 (e.g., a hard disk drive). The program modules may include an operating system 217. The program modules may also include an information display program module 219 comprising computer-executable instructions for displaying images or other information on a display screen 192. Other aspects of the exemplary embodiments of the invention may be embodied in a touch screen control program module 221 for controlling the energy source 120 and/or detectors 130, 131 of the touch screen system 100 and/or for calculating touch locations and discerning interaction states relative to the touch screen 110 based on signals received from the detectors 130, 131.

Certain embodiments of the invention may include a DSP unit for performing some or all of the functionality ascribed to the Touch Panel Control program module 221. As is known in the art, a DSP unit 205 may be configured to perform many types of calculations including filtering, data sampling, and triangulation and other calculations and to control the modulation of the energy source 120. The DSP unit 205 may include a series of scanning imagers, digital filters, and comparators implemented in software. The DSP unit 205 may therefore be programmed for calculating touch locations and discerning interaction states relative to the touch screen 110, as described herein.

The processor 202, which may be controlled by the operating system 217, can be configured to execute the computer-executable instructions of the various program modules. The methods of the present invention may be embodied in such computer-executable instructions. Furthermore, the images or other information displayed by the information display program module 219 may be stored in one or more information data files 223, which may be stored on any computer readable medium associated with the computing device 201.

As discussed above, when a user touches on or near the touch screen 110, a variation will occur in the intensity of the energy beams 150 that are directed across the surface of the touch screen 110. The detectors 130, 131 are configured to detect the intensity of the energy beams 150 reflected across the surface of the touch screen 110 and should be sensitive enough to detect variations in such intensity. Information signals produced by the detectors 130, 131 and/or other components of the touch screen display system 100 may be used by the computing device 201 to determine the location of the touch relative to the touch screen 110 (and therefore relative to the display screen 192) and to discern whether the touch is indicative of a selection state, a tracking state or a dragging state. The computing device 201 may also determine the appropriate response to a touch on or near the touch screen 110.

In accordance with some embodiments of the invention, data from the detectors 130, 131 may be periodically processed by the computing device 201 to monitor the typical intensity level of the energy beams 150 that are directed across the surface of the touch screen 110 when no touch is present. This allows the system to account for, and thereby reduce the effects of, changes in ambient light levels and other ambient conditions. The computing device 201 may optionally increase or decrease the intensity of the energy beams 150 emitted by the energy source 120, as needed. Subsequently, if a variation in the intensity of the energy beams 150 is detected by the detectors 130, 131, the computing device 201 can process this information to determine that a touch has occurred on or near the touch screen 110.

The location of a touch relative to the touch screen 110 may be determined, for example, by processing information received from each detector 130, 131 and performing one or more well-known triangulation calculations. By way of illustration, the computing device 201 may receive information from each detector 130, 131 that can be used to identify the position of an area of increased or decreased energy beam intensity relative to each detector 130, 131. The location of the area of decreased energy beam intensity relative to each detector 130, 131 may be determined in relation to the coordinates of one or more pixels, or virtual pixels, of the touch screen 110. The location of the area of increased or decreased energy beam intensity relative to each detector may then be triangulated, based on the geometry between the detectors 130, 131, to determine the actual location of the touch relative to the touch screen 110. Calculations to determine the interaction state indicated by the touch are explained with reference to the following figures. Any such calculations to determine touch location and/or interaction state can include algorithms to compensation for discrepancies (e.g., lens distortions, ambient conditions, damage to or impediments on the touch screen 110, etc.), as applicable.

FIG. 3, comprising FIG. 3A and FIG. 3B, illustrates a user interaction with the exemplary touch screen 110. The user interaction in the illustrated example is intended to indicate the tracking state. A portion of the user's finger 302 (or other object) enters into the energized plane (formed by the energy beams 150) adjacent to the touch screen surface and either "hovers" adjacent to the touch screen surface without making contact or contacts the touch screen surface with relatively slight pressure. The two detectors 130, 131, referred to for convenience as Camera₀ and Camera₁, generate information signals that indicate a variation in the intensity of the energized plane and, thus, the presence of a touch.

Image data captured by the detectors 130, 131 can be processed and interpreted to approximate the interaction state indicated by the touch. For example, the output from Camera₀ can be processed in a known manner to determine the slopes ($m_{0a}$ and $m_{0b}$) of the lines extending from a first reference point (e.g., a corner 303 of the touch screen 110) to a first pair of outer edges 304, 306 of the portion of the user's finger 302 that is within the field of view of the detector 130. Similarly, the output from Camera₁ can be processed to determine the slopes ($m_{1a}$ and $m_{1b}$) of the lines extending from a second reference point (e.g., a corner 305 of the touch screen 110) to a second pair of outer edges 308, 310 of the portion of the user's finger 302 that is within the field of view of the detector 131. The choice of reference points (e.g., corners 303 and 305) of course depends on the geometry of the detectors 130, 131 relative to the touch screen 110. The intersection points of the four calculated slope lines ($m_{0a}$, $m_{0b}$, $m_{1a}$ and $m_{1b}$) can then be used to approximate the surface area (S) of that portion of the user's finger 302 that is within the field of view of the detector 130, 131. The surface area of the portion of the user's finger 302 that is within the field of view of the detector 130, 131 (S) is referred to herein as the "touch area," though it should be understood, as mentioned above, that a "touch" does not necessarily require actual contact between the finger 302 (or other object) and the touch screen 110.

In contrast to the tracking state example of FIG. 3, the user interaction illustrated in FIG. 4A and FIG. 4B is intended to indicate the selection or "clicking" state. A portion of the user's finger 302 (or other object) enters into (or remains in) the energized plane adjacent to the touch screen surface and contacts the touch screen surface with relatively greater pressure than in the example of FIG. 3. The two detectors 130, 131 again generate information signals that indicate a variation in the intensity of the energized plane and, thus, the presence of a touch. In the example of FIG. 4, the user's finger 302 may have entered the energized plane from an out-of-range position. Alternatively, the position of the user's finger within the energized plane may have changed such that it comes into contact the touch screen surface from a prior hover (non-contact) position or increases pressure on the touch screen surface.

Again, the output from Camera₀ can be processed in a known manner to determine the slopes ($m'_{0a}$ and $m'_{0b}$) of the lines extending from a first reference point (e.g., a corner 303 of the touch screen 110) to a first pair of outer edges 304', 306' of the portion of the user's finger 302 that is within the field of view of the detector 130. Similarly, the output from Camera₁ can be processed to determine the slopes ($m'_{1a}$ and $m'_{1b}$) of the lines extending from a second reference point (e.g., a corner 305 of the touch screen 110) to a second pair of outer edges 308', 310' of the portion of the user's finger 302 that is within the field of view of the detector 131. The intersection points of the four calculated slope lines ($m'_{0a}$, $m'_{0b}$, $m'_{1a}$ and $m'_{1b}$) can then be used to approximate the touch area (S').

By way of comparison, FIG. 4A shows the slope lines ($m'_{0a}$, $m'_{0b}$, $m'_{1a}$ and $m'_{1b}$) and touch area (S') indicative of the selection state in solid lines and shows the slope lines ($m_{0a}$, $m_{0b}$, $m_{1a}$ and $m_{1b}$) and touch area (S) indicative of the tracking state (from FIG. 3) in broken lines. As illustrated, the touch area (S') indicative of the selection state is greater than the touch area (S) indicative of the selection state. This is so because the user's finger 302 is flexible and deforms at the point of contact (or deforms more greatly upon increase in contact pressure) to cover a larger area of the touch screen surface when the user contacts (or increases contact pressure on) the touch screen surface to make a selection.

The computing device 201 can be used to calibrate the touch screen system 100, such that a threshold touch area is designated to represent a tracking state. Following calibration, the computing device 201 may be programmed to designate as a "selection" any detected touch having a calculated touch area exceeding the threshold touch area. As will be recognized by those of skill in the art, an exemplary calibration method involves prompting the user to perform a tracking operation with respect to the touch screen 110, calculating the touch area while the user is doing so, and then storing that calculated touch area plus an optional error or "hysteresis" value as the threshold touch area.

In certain embodiments, the calibration step may be performed automatically when the user's finger 302 or stylus is at rest. Such a calibration method assumes that the user's finger or stylus will remain in a stationary "tracking" mode for some period of time before additional pressure is applied to indicate a "selection" operation. Other methods for calibrating the exemplary touch screen system 100 will be apparent to those of ordinary skill in the art and are therefore considered to be within the scope of the present invention.

In certain embodiments, the following exemplary trigonometric calculations can be used to approximate touch area. The equations are best understood with reference to FIG. 5. However, it should be noted that FIG. 5 is provided as an exemplary reference only. To start:

let the cameras lie on y=0 and be 1 unit of distance apart
and $m_{0a}$=slope of the first edge seen by Camera₀
and $m_{0b}$=slope of the second edge seen by Camera₀
and $m_{0c}$=average of $m_{0a}$ and $m_{0b}$
and $m_{1a}$=slope of the first edge seen by Camera₁
and $m_{1b}$=slope of the second edge seen by Camera₁
and $m_{1c}$=the average of $m_{1a}$ and $m_{1b}$
and $(x_{0a}, y_{0a})$=the intersection of $m_{0a}$ and $m_{1c}$
and $(x_{0b}, y_{0b})$=the intersection of $m_{0b}$ and $m_{1c}$
and $(x_{0c}, y_{0c})$=the intersection of $m_{0c}$ and $m_{1c}$, the touch center
and $(x_{1a}, y_{1a})$=the intersection of $m_{1a}$ and $m_{0c}$
and $(x_{1b}, y_{1b})$=the intersection of $m_{1b}$ and $m_{0c}$
as this is the same as $(x_{0c}, y_{0c})$ and $r_0$=the distance of the touch center from Camera₀
and $r_1$=the distance of the touch center from Camera₁
and $w_0$=the width or distance of point $(x_{0a}, y_{0a})$ to $(x_{0b}, y_{0b})$
and $w_1$=the width or distance of point $(x_{1a}, y_{1a})$ to $(x_{1b}, y_{1b})$
then to calculate the width ($w_0$) of the touch area as observed by Camera₀, the following equations are used:

$$x_{0a} = m_{1c}/(m_{0a} - m_{1c})$$

$$y_{0a} = m_{0a} * x_{0a}$$

$$x_{0b} = m_{1c}/(m_{0b} - m_{1c})$$

$$y_{0b} = m_{0b} * x_{0b}$$

$$x_{0c} = m_{1c}/(m_{0b} - m_{1c})$$

$$y_{0c} = m_{0b} * x_{0c}$$

$$r_0 = sqrt(x_{0c}^2 + y_{0c}^2)$$

Similar equations can be used to calculate the width ($w_1$) of the touch area as observed by Camera$_1$. After solving for width, the touch area (S) can be calculated using the following equation:

$$S = w_0 * w_1,$$

where $w_0$ is the width of the touch area as detected from Camera$_0$ and $w_1$ is the width of the touch area as detected from Camera$_1$.

FIG. 6, comprising FIG. 6A and FIG. 6B, shows a simple stylus 602 that has been modified to enable multiple touch areas based on applied pressure. The stylus 602 includes a spring loaded plunger 604 that is designed to collapse into the tip 606 of the stylus 602 when sufficient compression is applied to the spring 608. Thus, when the stylus 602 is made to hover in proximity to the touch screen 110 or to contact the touch screen 110 without sufficient pressure to compress the spring 608, the plunger 604 will remain protruded from the tip 606. The detectors 130, 131 will detect the presence of the plunger 604 and the computing device 201 will base the computation of touch area (S) on the detected size of the plunger. Conversely, when the stylus 602 is made to contact the touch screen 100 with sufficient pressure to compress the spring 608, the plunger 604 will collapse into the tip 606, which will itself contact the touch screen 110. The computing device 201 will thus base the computation of the enlarged touch area (S') on the detected size of the stylus tip 606.

The stylus 602 of FIG. 6 is designed to operate in a manner similar to a finger 302, which creates an enlarged touch area when pressure is applied. Other stylus designs can accomplish similar functionality. For example, similar functionality could be provided by a stylus having a rubber tip that expands (area-wise) when pressure is applied to it. Accordingly, any stylus or other object that can be used to indicate both a smaller and a larger area can be used in accordance with embodiments of the present invention.

Figure 7:
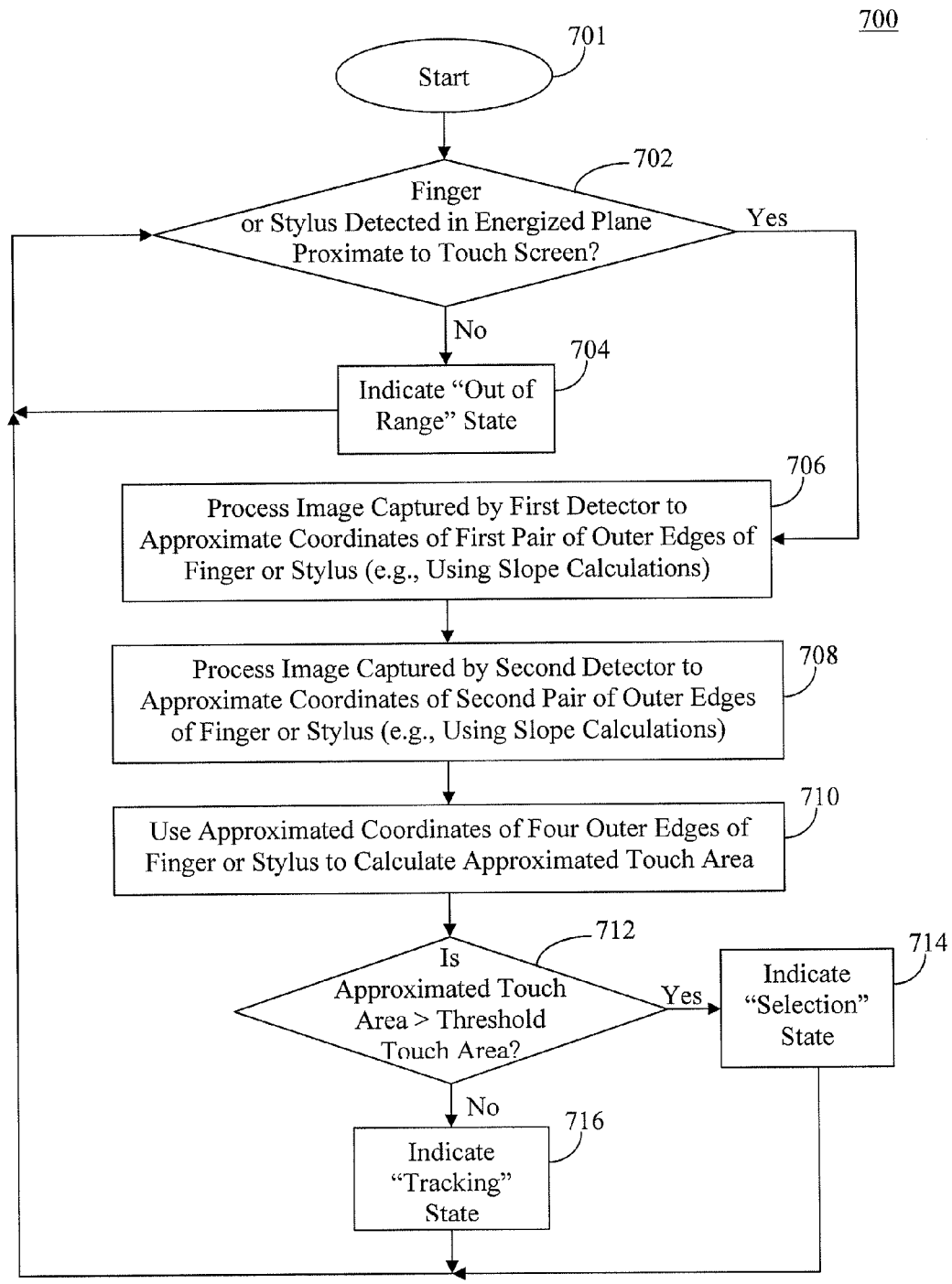
FIG. 7 is a flow chart illustrating an exemplary method for discerning between a tracking state and a selection in a touch screen system, in accordance with certain exemplary embodiments of the present invention.

FIG. 7 is a flow chart illustrating an exemplary method 700 for discerning between a tracking state, a selection state and an out-of-range state. The method 700 begins at starting block 701 and proceeds to step 702, where a determination is made as to whether a finger or stylus is detected in the energized plane proximate to the touch screen. If no finger or stylus is detected, the method advances to step 704, where the interaction state is indicated to be "out-of-range". Following step 704 the method loops back to step 702 for further process. When a finger or stylus is detected at step 702, the method proceeds to step 706, where an image captured by a first detector is processed to determine approximate coordinates for a first pair of outer edges of the finger or stylus. For example, such coordinates may be determined using slope line calculations. Next at step 708, an image captured by a second detector is processed to determine approximate coordinates for a second pair of outer edges of the finger or stylus. At step 710, the approximated coordinates of the two pairs of outer edges of the finger or stylus are used to calculate an approximated touch area.

After calculating an approximated touch area at step 710, the method proceeds to step 712 for a determination as to whether the approximated touch area is greater than a threshold touch area. The threshold touch area may be established through calibration of the touch screen system 100 or may be specified by a system operator or administrator. If the approximated touch area is greater than the threshold touch area, a selection state is indicated at step 712. If the approximated touch area is not greater than the threshold touch area, a tracking state is indicated at step 714. From either step 712 or step 714, the method returns to step 702 for further processing.

As will be apparent to those of ordinary skill in the art, touch position calculations can be performed in sequence or in parallel with the calculations to approximate interaction state. Thus, if movement of the finger or stylus is detected while iterations through the exemplary method 700 indicate a continued selection state, the continued selection state will be recognized as a dragging state. Indication of a continued tracking state in conjunction with movement of the finger or stylus may be recognized, for example, as requiring a cursor to follow the finger or stylus.

Figure 8:
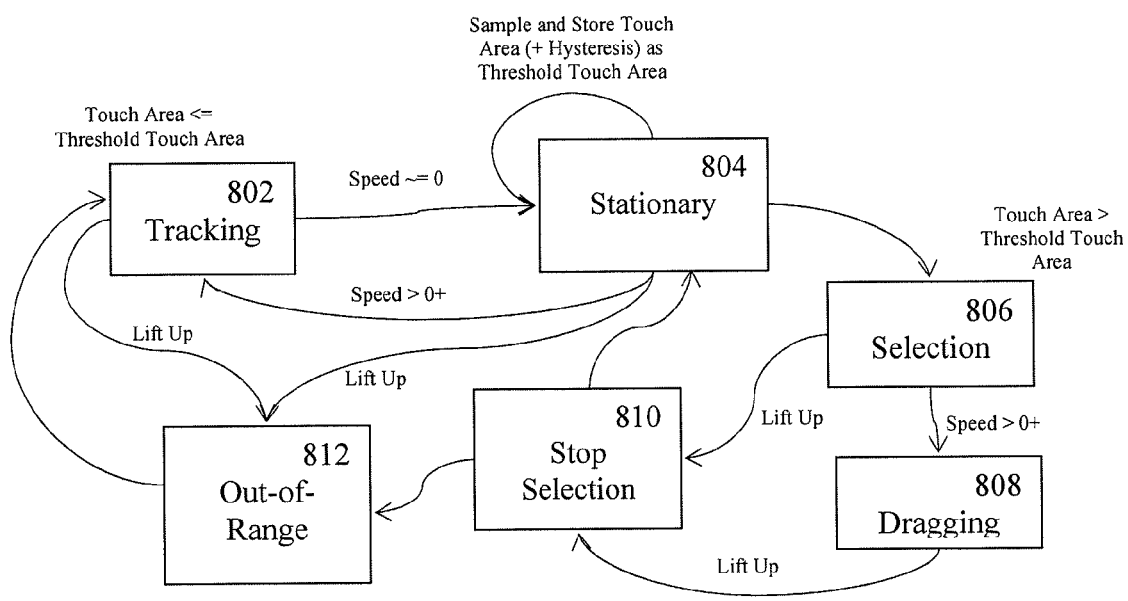
FIG. 8 is a state diagram showing the operation sequence of certain exemplary embodiment of the present invention.

FIG. 8 is a state diagram showing the operation sequence of certain exemplary embodiment of the present invention. The tracking state 802 is indicated when the user's finger or stylus is detected within the energized plane in proximity to the touch screen 110 and a calculated touch area is determined to be less than or equal to a threshold touch area. If the finger or stylus is not moving (i.e., detected velocity is approximately zero), the stationary state 804 is indicated. During the stationary state 804, a threshold touch area can optionally be calibrated, for example as a background process. From the stationary state 804, if the finger or stylus starts to move (i.e., detected velocity is greater than zero) and the calculated touch area remains less than or equal to the threshold touch area, the tracking state 802 is again indicated.

From the stationary state 804, if the calculated touch area is determined to be greater than the threshold touch area, the selection state 806 indicated. If the finger or stylus starts to move when the selection state 806 is indicated, the dragging state 808 is indicated. If the calculated touch area is determined to be less than or equal to the threshold touch area (i.e., the finger or stylus is lifted at least partially away from the touch screen 110) when either the selection state 806 or the dragging state 808 has been indicated, a stop selection state 810 is indicated. From the stop selection state 810, if the finger or stylus remains within the energized plane, the stationary state 804 is again indicated. From either the tracking state 802, the stationary state 804 or the stop selection state 810, if the finger or stylus has been lifted completely away from the touch screen 110, the out-of-range state 112 is indicated.

Those skilled in the art will appreciate that the state machine diagram of FIG. 8 is provided by way of example only and that additional and/or alternative states and state transitions are possible. For instance, other embodiments of the invention can be configured to transition directly from a tracking state 802 to a selection state 806 or a dragging state 808. Similarly, the invention can be configured in certain embodiments to transition directly from a selection state 806 or a dragging state 808 to a tracking state 802 or an out-of-range state 812. Accordingly, the scope of the present invention is not intended to be limited by the exemplary state machine diagram of FIG. 8, nor the exemplary flow diagram of FIG. 6.

It should further be appreciated by those skilled in the art that certain functionality of the exemplary embodiments of the invention may be provided by way of any type and number of program modules, created in any programming language, which may or may not be stored locally at the computing device 201. For example, the computing device 201 may comprise a network server, client, or appliance that may be configured to execute program modules that are stored on another network device and/or for controlling a remotely located touch screen system.

Based on the foregoing, it can be seen that the present invention provides an improved touch screen system that can approximate tracking and dragging states, regardless of the touch orientation and without reliance on direct sensing of touch pressure or area. Many other modifications, features and embodiments of the present invention will become evident to those of skill in the art. For example, those skilled in the art will recognize that embodiments of the present invention are useful and applicable to a variety of touch screens, including, but not limited to, optical touch screens, IR touch screens, and capacitive touch screens. It should be appreciated, therefore, that many aspects of the present invention were described above by way of example only and are not intended as required or essential elements of the invention unless explicitly stated otherwise.

Accordingly, it should be understood that the foregoing relates only to certain embodiments of the invention and that numerous changes may be made therein without departing from the spirit and scope of the invention as defined by the following claims. It should also be understood that the invention is not restricted to the illustrated embodiments and that various modifications can be made within the scope of the following claims.

What is claimed is:

1. A method of discerning between user interaction states in a touch screen system, comprising:
    receiving a first signal from a first detector of said touch screen system, said first signal representing a first image of an object interacting with a touch screen;
    receiving a second signal from a second detector, said second signal representing a second image of the object interacting with the touch screen;
    processing the first signal to determine approximated coordinates of a first pair of outer edges of the object;
    processing the second signal to determine approximated coordinates of a second pair of outer edges of the object;
    calculating an approximated touch area based on the approximated coordinates of the first pair of outer edges and the approximated coordinates of the second pair of outer edges of the object;
    if the approximated touch area is less than or equal to a threshold touch area, determining that the object interacting with the touch screen indicates a tracking state;
    if the approximated touch area is greater than the threshold touch area, determining that the object interacting with the touch screen indicates a selection state;
    if the object interacting with the touch screen indicates the selection state, determining whether the object moves relative to the touch screen;
    if the object moves relative to the touch screen, re-calculating the approximated touch area and determining whether the re-calculated touch area remains greater than or equal to the threshold touch area; and
    if the re-calculated touch area remains greater than the threshold touch area, determining that the object interacting with the touch screen indicates a dragging state.

2. The method of claim 1, wherein the approximated coordinates of the first pair of outer edges and the approximated coordinates of the second pair of outer edges of the object are determined using slope line calculations.

3. The method of claim 1, wherein the threshold touch area is established by calibrating the touch screen system when the object interacting with the touch screen is known to indicate the tracking state.

4. The method of claim 1, wherein the threshold touch area is established by an operator of the touch screen system.

5. The method of claim 1, further comprising:
    if the object interacting with the touch screen indicates either the selection state or the tracking state, determining whether the object becomes undetected by the first detector and the second detector; and
    if the object becomes undetected by the first detector and the second detector, determining that the object interacting with the touch screen indicates an out-of-range state.

6. The method of claim 1, further comprising if the re-calculated touch area does not remain greater than the threshold touch area, determining that the object interacting with the touch screen indicates the tracking state.

7. The method of claim 1, further comprising:
    if the object interacting with the touch screen indicates either the selection state, the dragging state or the tracking state, determining whether the object becomes undetected by the first detector and the second detector; and
    if the object becomes undetected by the first detector and the second detector, determining that the object interacting with the touch screen indicates an out-of-range state.

8. The method of claim 1, wherein the first detector and the second detector are each selected from the group consisting of: a line scan camera, an area scan camera and a phototransistor.

9. A touch screen system for discerning between user interaction states, comprising:
    a touch screen;
    a first detector in proximity to the touch screen for generating a first signal representing a first image of an object interacting with the touch screen;
    a second detector in proximity to the touch screen for generating a second signal representing a second image of the object interacting with the touch screen; and
    a signal processor for executing computer-executable instructions for:
        processing the first signal to determine approximated coordinates of a first pair of outer edges of the object,
        processing the second signal to determine approximated coordinates of a second pair of outer edges of the object,
        calculating an approximated touch area based on the approximated coordinates of the first pair of outer edges and the approximated coordinates of the second pair of outer edges of the object,
        if the approximated touch area is less than or equal to a threshold touch area, determining that the object interacting with the touch screen indicates a tracking state,
        if the approximated touch area is greater than the threshold touch area, determining that the object interacting with the touch screen indicates a selection state,
        if the object interacting with the touch screen indicates the selection state, determining whether the object moves relative to the touch screen,
        if the object moves relative to the touch screen, re-calculating the approximated touch area and determining whether the re-calculated touch area remains greater than or equal to the threshold touch area, and
        if the re-calculated touch area remains greater than or equal to the threshold touch area, determining that the object interacting with the touch screen indicates a dragging state.

10. The touch screen system of claim 9, wherein the approximated coordinates of the first pair of outer edges and the approximated coordinates of the second pair of outer edges of the object are determined using slope line calculations.

11. The touch screen system of claim 9, wherein the threshold touch area is established by calibrating the touch screen system when the object interacting with the touch screen is known to indicate the tracking state.

12. The touch screen system of claim 9, wherein the signal processor executes further computer-executable instructions for:
   if the object interacting with the touch screen indicates either the selection state or the tracking state, determining whether the object becomes undetected by the first detector and the second detector; and
   if the object becomes undetected by the first detector and the second detector, determining that the object interacting with the touch screen indicates an out-of-range state.

13. The touch screen system of claim 9, wherein the signal processor executes further computer-executable instructions for determining that the object interacting with the touch screen indicates the tracking state, if the re-calculated touch area does not remain greater than the threshold touch area.

14. The touch screen system of claim 9, wherein the signal processor executes further computer-executable instructions for:
   if the object interacting with the touch screen indicates either the selection state, the dragging state or the tracking state, determining whether the object becomes undetected by the first detector and the second detector; and
   if the object becomes undetected by the first detector and the second detector, determining that the object interacting with the touch screen indicates an out-of-range state.

15. The touch screen system of claim 9, wherein the first detector and the second detector are each selected from the group consisting of: a line scan camera, an area scan camera and a phototransistor.

16. The touch screen system of claim 9, further comprising a light source for illuminating the object; and
   wherein the first detector and the second detector detect illumination level variations caused by the object interacting with the touch screen.

17. The touch screen system of claim 9, wherein the object comprises a user's finger.

18. The touch screen system of claim 9, wherein the object comprises a stylus having a spring loaded plunger protruding from a tip of the stylus, said plunger producing a relatively small touch area when interacting with the touch screen; and
   wherein said plunger collapses into the tip of the stylus when sufficient compression is applied to the spring, causing the tip of the stylus to contact the touch screen and producing a relatively larger touch area.

* * * * *